July 31, 1956     H. J. BICHSEL     2,757,296
COMBINATION AC AND DC WELDER
Filed Oct. 15, 1953

WITNESSES:
E. A. McCloskey
Leon M. Garman

INVENTOR
Harry J. Bichsel.
BY
Hymen Diamond
ATTORNEY

United States Patent Office 2,757,296
Patented July 31, 1956

2,757,296
COMBINATION A. C. AND D. C. WELDER

Harry J. Bichsel, East Aurora, N. Y., assignor to Westinghouse Electric Corporation, East Pittsburgh, Pa., a corporation of Pennsylvania Application October 15, 1953, Serial No. 386,280

5 Claims. (Cl. 307—80)

My invention relates to power supply apparatus and has particular relation to arc welding apparatus.

In many of the plants in which arc welding is carried out, it is necessary that the facility for welding both with alternating current as well as direct current be available. Thus, for high speed sheet metal work, direct-current welding, particularly at reverse polarity (electrode positive), is preferred because of the stability of the direct-current arc, while in the welding of aluminum with a non-consumable tungsten electrode, for example, alternating current is to be preferred because the electrode or the work (whichever is the positive) would tend to become excessively heated at direct current and because of the facility for cleaning work which alternative current affords. In accordance with the teachings of the prior art, plants which carry out both alternating- and direct-current welding require welders of both types. This requirement is not only costly but also time-consuming since when a change in the current supply for the welder is to be made, the operator must disconnect the welder which he is using, procure another welder and connect it to the work.

It is accordingly an object of my invention to provide welding apparatus which shall serve both for direct-current and for alternating-current welding.

Another object of my invention is to provide welding apparatus of simple and low-cost structure which shall be readily convertible from alternating-current to direct-current service.

An incidental object of my invention is to provide novel power converting apparatus.

My invention arises from the realization that an alternating-current transformer having a voltage within a certain range adequate for alternating-current welding is also capable of supplying through a full-wave rectifier a voltage adequate for direct-current welding. Specifically, I have found that an arc welding transformer having a secondary open-circuit voltage of the order of from 80 to 85 R. M. S. alternating current is suitable for alternating-current welding, and the same transformer is capable of supplying current through a full-wave rectifier potential which is adequate for direct-current welding. Thus, let V be the open circuit R. M. S. alternating-current voltage, and VDc the corresponding direct-current voltage. Then VDc is given by the relationship $$V_{D.C.} = \frac{V\sqrt{2}\, 2}{\pi}$$

At V=80 volts, $V_{D.C.}$=72.5 volts; at V=85 volts, $V_{D.C.}$=77 volts.

The above relationships are derived assuming an ideal rectifier which has no leakage. In actual fact, there is leakage and for a selenium rectifier which is used in the usual practice of my invention, the equation for VDc is $$V_{D.C.} = \frac{1}{1.15} V, \frac{2\sqrt{2}}{\pi} \text{ is about } \frac{1}{1.11}$$

Assuming the $\frac{1}{1.15}$ factor at V=80, VDc=69.6 and at V=85, VDc=73.6. Thus for an alternating-current voltage of 80 to 85 volts, the direct-current voltage is of the order of 70 to 75 volts. An open-circuit voltage of 80 to 85 volts R. M. S. alternating current is adequate for alternating-current welding, and an open-circuit direct-current voltage of 69 to 75 volts is adequate for direct-current welding. The upper limits of approximately 75 and 85 volts are reasonably safe for operating terminal, but in accordance with the preferred practice of my invention, I prefer to maintain the A. C.-R. M. S. voltage at no higher than 80. Thus the D. C. voltage would be no higher than 69.6. Both the 80 volts A. C. and the 69.6 D. C. are adequate for welding. If ultimate safety is required, facilities for reducing the open-circuit voltage automatically, such as are available in the art, may be included.

The novel features that I consider characteristic of my invention are set forth generally above. The invention itself, both as to its organization and its method of operation, together with additional objects and advantages thereof, will be understood from the following description of a specific embodiment when read in connection with the accompanying drawing, in which.

Figure 1:
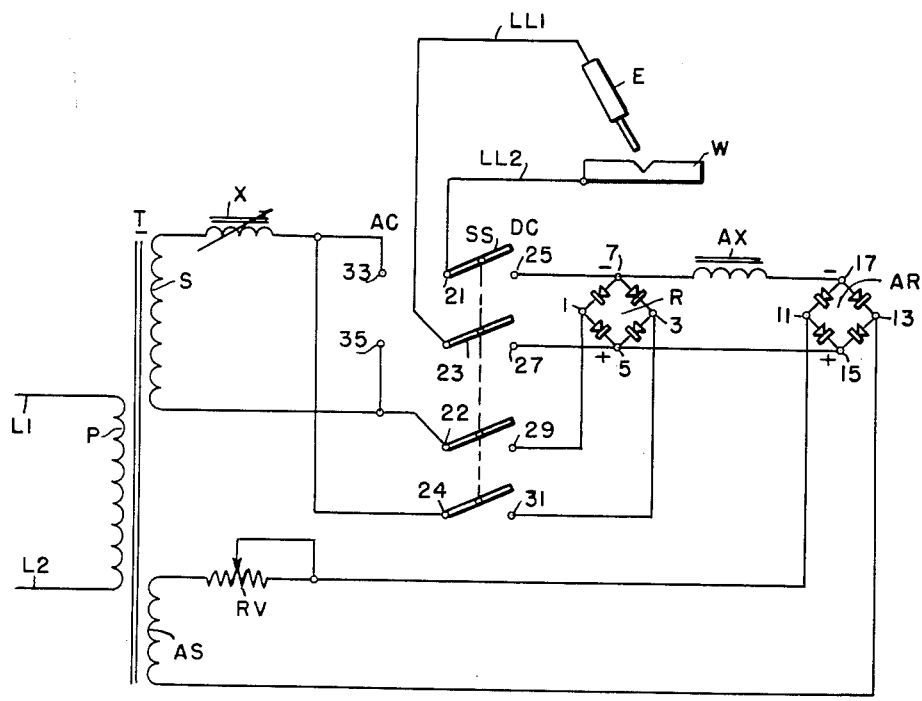
Figure 1 is a circuit diagram of a preferred embodiment of my invention.

The apparatus shown in Fig. 1 comprises a welding transformer T having a primary P, a main secondary S and an auxiliary secondary AS. In the practice of my invention, the primary P is connected across the buses L1, L2 of a commercial alternating-current supply, such as is provided by public utility companies.

The apparatus disclosed also includes a main rectifier R having input connections 1 and 3 which are in the use of the rectifier connected to an alternating-current supply and output connections 5 and 7 at which direct current is derived, one connection 5 being of positive polarity and the other 7 negative polarity. The apparatus also includes an auxiliary rectifier AR also having input connections 11 and 13 and output connections 15 and 17, of which 15 is positive and 17 negative. The input connections are connected to the auxiliary secondary AS through a variable resistor RV. The negative output connection 17 is connected to the negative output connection 7 of the main rectifier R and the positive output connection 15 is connected to the positive output connection 5 of the main rectifier R. A reactor AX is interposed between one of the sets of connections 5 and 15 or 7 and 17, and in the apparatus shown in the drawing is interposed between the negative connections 7 and 17. It is to be noted that the rectifiers R and AR are so connected as to supply any load across the output connections in parallel, but the rectifier R is connected opposite to rectifier AR so that current flowing through the rectifier AR is not capable of flowing through the rectifier R. Thus, the rectifier R does not constitute a short-circuit across the output of the rectifier AR.

The apparatus disclosed in the drawing also includes a welding electrode E and work W. The electrodes E and W are connected to load conductors LL1 and LL2 which, in turn, are connected each to a movable contact 21 and 23 of a selector switch SS. The selector switch SS has in addition to the contacts 21 and 23 two movable contacts 22 and 24. The contact 22 is connected to the lower terminal of the secondary S and the contact 24 to the reactor X.

The movable contacts 21 through 24 of the selector switch SS has two positions, in one of which, labelled DC, it engages four fixed poles 25, 27, 29, 31 and in the other of which, labeled AC, it engages two poles 33 and 35. The poles 25 and 27 are connected to the output terminals 5 and 7 of the main rectifier R and the poles 29 and 31 are connected to the input terminals 1 and 3 of the rectifier R, so that in the direct-current position of switch SS, the four movable contacts of the switch connect the main secondary S through a variable reactor to the rectifier R, and the output connections of the rectifier R to the electrode E and the work W. The poles 33 and 35 are connected respectively to the reactor X and the lower terminal of the secondary S so that in the alternating-current position of the switch, the secondary S is connected through reactor X directly between the electrode E and the work W. It is seen that in the direct-current position of the switch SS, direct current is supplied between the electrodes E and W from the secondaries S and AS through the rectifiers R and AR. In this position of the switch, the apparatus is of the type disclosed in Fig. 1 of my application Serial No. 295,756, filed June 26, 1952, and assigned to Westinghouse Electric Corporation. In the other position of the switch, alternating current is supplied between the electrode E and the work W.

In accordance with my invention, the relationship between the primary P and the secondary S of the transformer T is such that with the switch SS connected in the D. C. position, direct-current welding may be conducted with the electrode E and the work W, and with the switch in the A. C. position, alternating-current welding may be conducted. In the preferred practice of my invention, the secondary voltage S should be of the order of 80 to 85 volts, and under such circumstances, the voltage at the output 5—7 of the rectifier is between about 70 and 75 volts. The voltage of the secondary AS should be as specified in my above-described application.

In using apparatus in accordance with my invention, the selector switch SS is connected to the electrode E and the work W, as shown in the drawing. The circuit breakers or other power switching equipment (not shown) for the apparatus are closed and the transformer T is thus energized. If the work is of the type requiring direct-current welding, the selector switch SS is set in the D. C. position. The electrode is then brought into contact with the work and removed to produce the desired arc. The welding may then proceed. If the work is of the type requiring alternating-current welding, the selector switch is connected in the A. C. position, and the electrode E and the work W are supplied with an alternating-current arc.

While I have shown and described a certain specific embodiment of my invention, many modifications thereof are possible.

Figure 2:
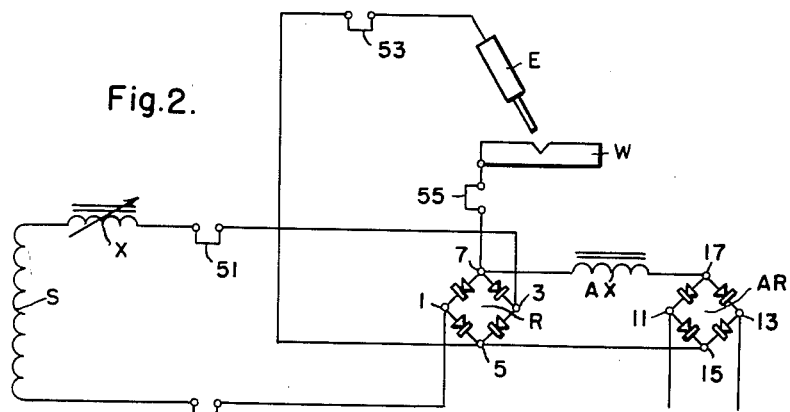
Fig. 2 is a circuit diagram showing the essential features of a modification of my invention.

For example, the selector switch SS may be replaced by ordinary jumpers and plug connectors as in the modification shown in Fig. 2. In such event, a jumper 51 is provided between the reactor X and one terminal of the rectifier R. In addition, connectors 53 and 55 are provided between each of the output connections 5 and 7 of the main rectifier R and the work W and the electrode E, and another connector 57 is provided between the remaining input connection to the main rectifier R and the long terminal of the secondary S. This modification is set for direct-current welding by connecting the jumper 51 to one of the input connections 3 of the main rectifier R and closing the connection 57 to the other input connection 1 of the main rectifier R and also closing the connections 53 and 55 between the output connections of the main rectifier R and the electrode E and the work W. The apparatus may be set for alternating-current welding by disconnecting the jumper 53 and opening the connections 51 and 55 above mentioned, and connecting the reactor X and the lower terminal of the secondary S directly to the electrode E and the work W.

My invention is not to be restricted except insofar as is necessitated by the spirit of the prior art.

I claim as my invention:

1. Arc welding apparatus including a welding transformer having primary and secondary windings, said transformer being capable of producing an open circuit voltage of the order of 80 R. M. S. at its secondary when its primary is supplied from the buses of a commercial supply, terminals for connection to a welding electrode and work, rectifier means having input and output connections, and means for selectively connecting said input connections to be supplied from said secondary and said output connections to said terminals or said terminals to be supplied directly from said secondary.

2. Arc welding apparatus including a welding transformer having primary and secondary windings, terminals for connection to a welding electrode and work, rectifier means having input and output connections, and means for selectively connecting said input connections to be supplied from said secondary and said output connections to said terminals or said terminals to be supplied directly from said secondary, said apparatus being characterized by a welding transformer having a winding relationship such that when the primary is connected to public utility buses the open circuit voltage across the secondary and at the output connections are both of a magnitude suitable for arc welding.

3. Apparatus according to claim 2 characterized by variable reactor means interposed between the secondary and the selective connecting means for setting the magnitude of the welding current.

4. In combination, a transformer having a primary, a first secondary and a second secondary; a pair of load terminals: main rectifier means having input and output connections; auxiliary rectifier means having input and output connections; means for connecting said second secondary across said input connections of said auxiliary rectifier means; means for connecting said output connections of said auxiliary rectifier means to said output connections of said main rectifier means, the above said output connections being so connected that the potentials impressed on said output connections of said main rectifier means by both said rectifier means are of the same polarity; and means for selectively connecting said first secondary directly to said load terminals or said output connections to said load terminals and said first secondary to said input connections of said main rectifier means.

5. The combination according to claim 4 characterized by main rectifier means which is a full-wave rectifier and by a transformer having a winding relationship such that an open-circuit potential of the order of between 80 and 85 volts R. M. S. appears across the first secondary when the primary is connected to be supplied from the bases of a commercial alternating-current source.

References Cited in the file of this patent
UNITED STATES PATENTS 1,953,602    Hanley _____ Apr. 3, 1934
2,343,411    Grandstaff et al. _____ Mar. 7, 1944